United States Patent [19]

Reba et al.

[11] 3,999,696
[45] Dec. 28, 1976

[54] WEB THREADING SYSTEM

[75] Inventors: Imants Reba, Vancouver, Wash.;
Gerald H. Hogland, Estacada; Fred L. Pollard, Portland both of Oreg.

[73] Assignee: Crown Zellerbach Corporation, San Francisco, Calif.

[22] Filed: May 27, 1975

[21] Appl. No.: 581,306

[52] U.S. Cl. .................................... 226/7; 226/91; 226/97
[51] Int. Cl.² .................................... B65H 17/32
[58] Field of Search ............ 226/7, 97, 91; 34/156, 34/160

[56] References Cited
UNITED STATES PATENTS

| | | |
|---|---|---|
| 3,462,054 | 8/1969 | Foor .................................... 226/91 |
| 3,559,301 | 2/1971 | Fraser .................................... 34/156 |
| 3,587,177 | 6/1971 | Overly .................................... 34/156 |
| 3,705,676 | 12/1972 | Overly .................................... 226/97 |
| 3,711,960 | 1/1973 | Overly .................................... 226/97 X |

Primary Examiner—Richard A. Schacher
Attorney, Agent, or Firm—Thomas R. Lampe; Corwin R. Horton

[57] ABSTRACT

A system for directing a web of flexible material to a predetermined location and more particularly to a system for directing the free end or tail of the web into threading engagement with rolls forming a hip or the like. In the system a gas such as air is directed through a restricted opening under pressure whereupon it attaches itself to a flow attachment surface due to the "Coanda effect", is directed to the predetermined location and entrains ambient air. The tail of the web is placed into the path of the moving gas and entrained thereby. The gas is moving at a velocity greater than the velocity of the moving web and thus the web tail is straightened out and directed to the predetermined location.

15 Claims, 13 Drawing Figures

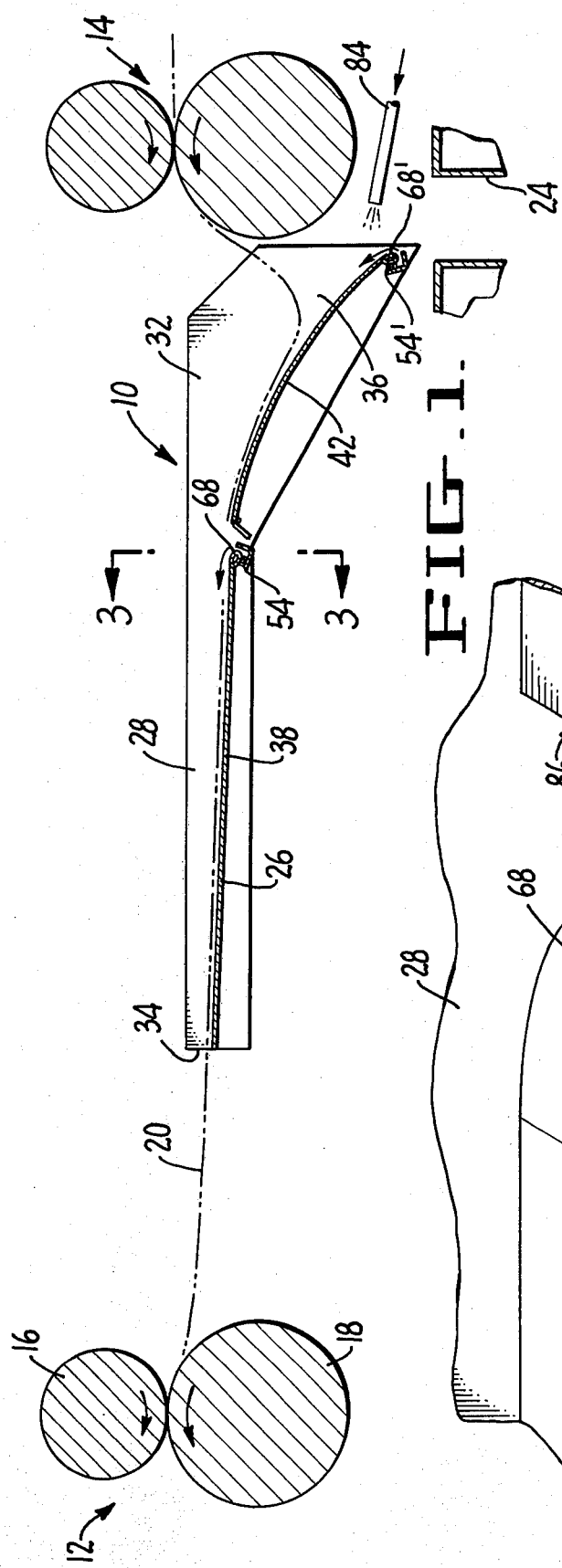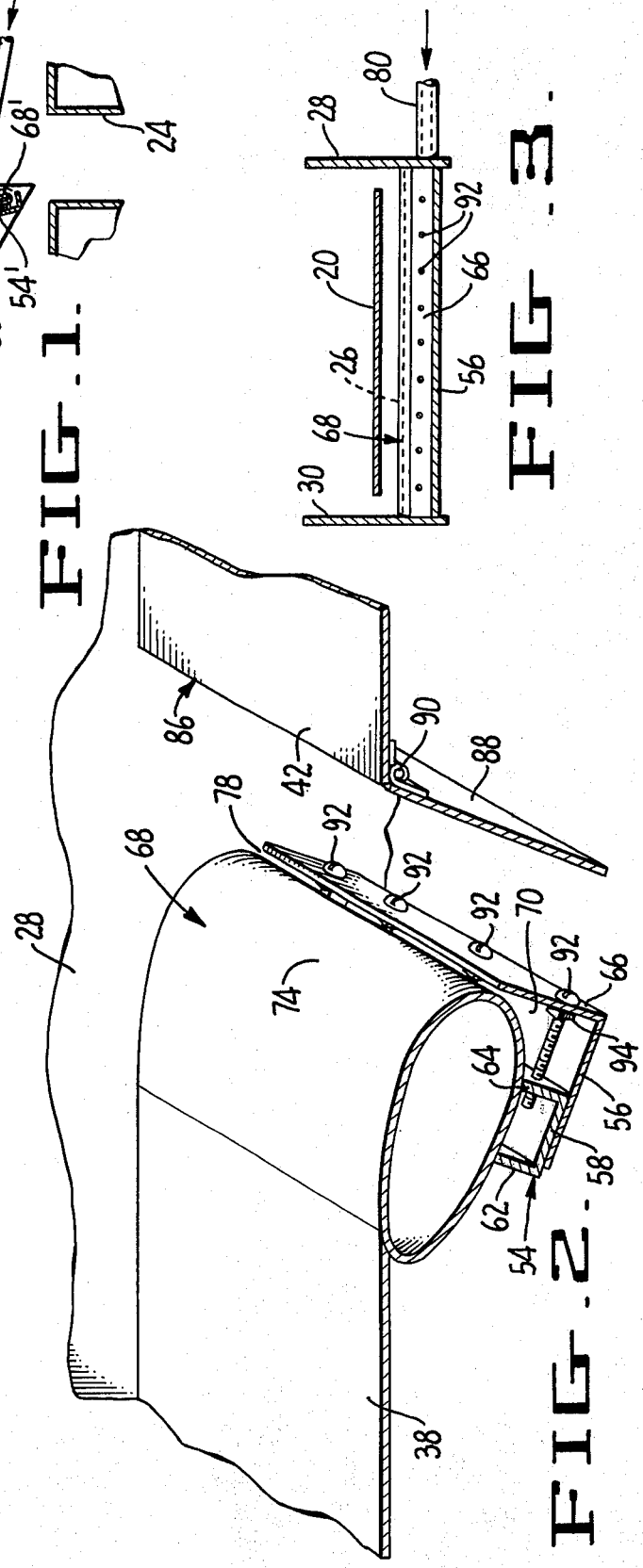

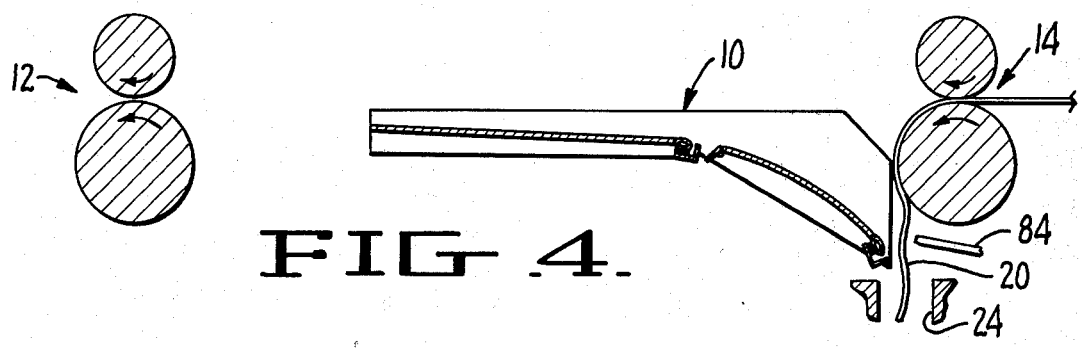
FIG. 4.
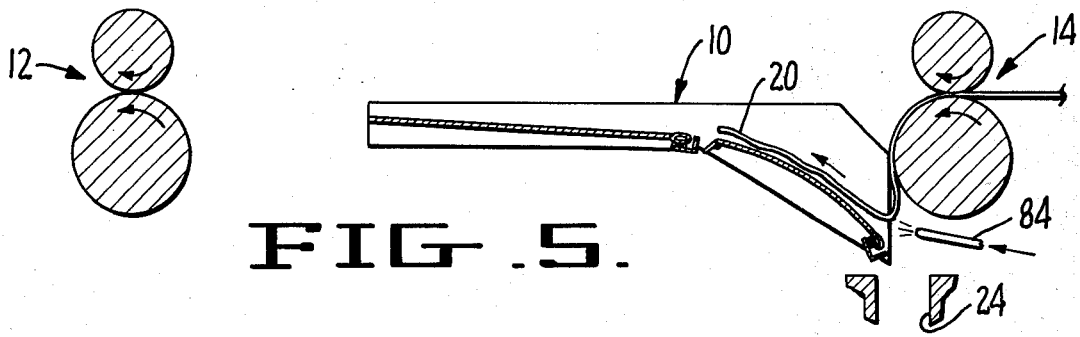
FIG. 5.
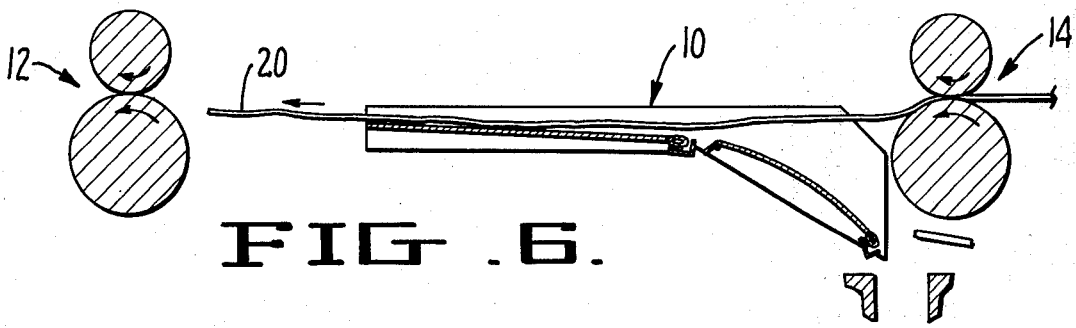
FIG. 6.
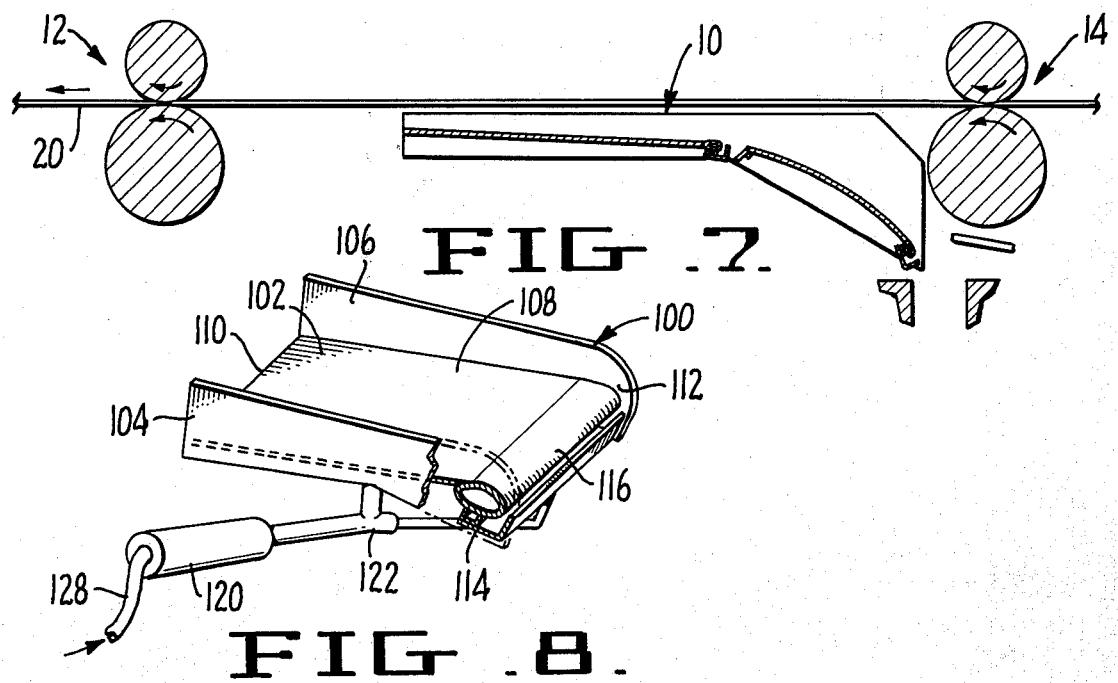
FIG. 7.
FIG. 8.

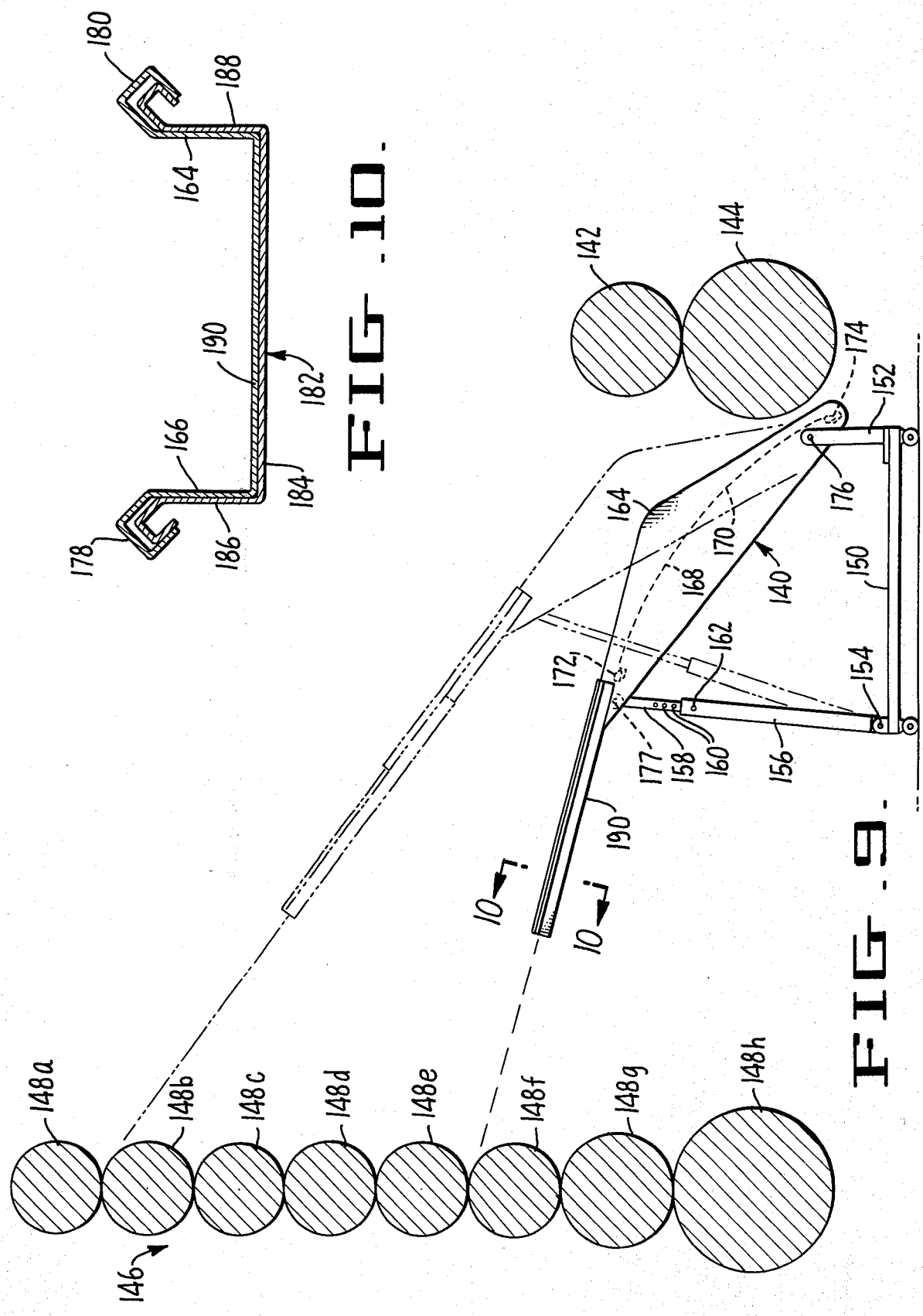

WEB THREADING SYSTEM

BACKGROUND OF THE INVENTION

In the manufacture of paper, plastic film or the like, web breakage occasionally occurs. Web breakage presents the operator with the difficult problem of rethreading the web, especially when the break occurs on continuously running machines, such as papermaking machines, since it is undesirable to shut down the machines completely due to attendant startup difficulties, etc. As a consequence, it is a commonly used technique for the machine operator and his assistants to attempt to manually grasp the free end or tail of the web on the fly while the machine continues to operate and direct it into close proximity with the next station, such as a roll nip. It will be appreciated that this is a difficult and dangerous procedure and it is possible for a person attempting to rethread a machine in such manner to become injured, even to the extent of losing fingers or hands. Also, this standard procedure is often quite time-consuming with numerous attempts to thread the web tail often being necessary before success is attained. Until rethread is successfully accomplished, production is lost.

With particular reference to paper machines, film rewinders and the like, various air jet arrangements have been employed in an attempt to blow the tail of the web into the next work station. An example of such an air jet arrangement is given in U.S. Pat. No. 3,066,882, C. B. Havens et al., issued Dec. 4, 1962. The problem with conventional air jet blower arrangements has been that they can be used only to deflect or convey the web tail end over relatively short distances. This is true even when conventional air jets are used in conjunction with a chute or other guide for the web tail or when a number of air jets are spaced along the web path. Further, such arrangements are inefficient since they use relatively large quantities of pressurized air. Over relatively large distances, 5-20 feet or even longer, the only feasible approach to rethreading a web tail "on the fly" has been the manual "bucket brigade" type of operation with all its attendant safety problems. It might be pointed out that in papermaking machines, for example, such long distances between the operation stages of the machine are not at all uncommon. The inability of prior art approaches to convey web tails over relatively long distances during the rethreading operation occasionally means that the machines running the webs cannot be run at their full operational capabilities. For example, it is not unknown for paper machines or the like to be run at slower speeds than they are capable of because of fear of web break and the heretofore time-consuming process of rethreading that would then be required. This is especially true where web break could possibly occur at a difficult rethreading location such as at a calender stack. Apparatus constructed in accordance with the teachings of the present invention can be used to rethread webs promptly and efficiently in even difficult locations such as at calender stacks. Hence, fear of web breakage occurring occasionally will not act as a deterrent to the efficient operation of the machine when the present invention is being utilized in conjunction therewith.

The present invention provides a system of relatively inexpensive and simple construction which utilizes a phenomenon known as the "Coanda effect" to entrain the free end or tail of a moving web of flexible material and direct it to a desired location such as the nip formed between two relatively movable rolls. The Coanda effect itself has been known for many years, as exemplified by U.S. Pat. No. 2,052,869, issued to Henri Coanda. Briefly, this phenomenon can be described as the tendency of a fluid, which emerges from a slit or similar restricted opening under pressure, to attach itself or cling to and follow a surface in the form of an extended lip of the slit, which lip recedes from the flow axis of the fluid as it emerges from the slit. This creates a zone of reduced pressure in the area of the slit so that relatively large quantities of ambient air or other entrainable material which are in the zone will become entrained and flow with the fluid which has attached itself to the extended lip.

SUMMARY

Apparatus constructed according to the present invention is disposed adjacent the normal path of movement of a web of flexible material and in proximity with the nip or other desired predetermined location to which the tail of the web is to be directed. The apparatus includes a wall element open to the atmosphere along at least a major portion of its length. A restricted opening, preferably in the form of a slit, is formed in the wall element and the restricted opening is in selective communication with a source of pressurized gas such as air. A substantially curved flow attachmemnt surface recedes from the restricted opening and leads toward an end of the wall element. The device is actuated by causing passage of the gas under a high velocity from the source of gas through the slit or other suitable restricted opening. Due to the Coanda effect, the gas passing through the restricted opening attaches to the flow attachment surface and is directed in the form of a high velocity gaseous sheet along the wall element toward the end thereof. The high velocity gaseous sheet causes entrainment of ambient air along the wall element. The tail of the web which is to be directed to the predetermined location is directed into the combined gaseous flow along the wall element. Because the velocity of gaseous flow is substantially greater than the speed of the moving web itself, the web tends to straighten out in the direction of the predetermined location and the web is aimed at the location with little or no manual assistance. When the tail enters the nip it is pulled tight and automatically lifts itself from the apparatus into its normal path of movement.

The apparatus according to the present invention may take a number of forms. For example, the apparatus may be mounted in a more or less permanent fashion or it may be mobile or even take the form of handheld operator-manipulated device. Further, the apparatus according to the present invention may be provided with a plurality of combinations of restricted openings and flow attachment surfaces and the smooth wall element thereof may assume different configurations depending upon operational requirements.

BRIEF DESCRIPTION OF THE DRAWINGS

Embodiments of the present invention are illustrated in the accompanying drawings in which:

FIG. 1 is a schematic side cross-sectional view illustrating one form of apparatus constructed according to the present invention being utilized to entrain and direct a web end;

FIG. 2 is an enlarged cross-sectional perspective view showing operational details of the means employed to create a high velocity gaseous flow in the channel interior of the apparatus of FIG. 1;

FIG. 3 is a cross-sectional view taken in the direction of line 3—3 of FIG. 1;

FIGS. 4, 5, 6 and 7 are schematic side cross-sectional views showing the apparatus of FIG. 1 in different and sequential stages of operation;

FIG. 8 is a fragmentary perspective view of a first alternative form of apparatus constructed in accordance with the teachings of the present invention;

FIG. 9 is a schematic side view illustrating a second alternative form of apparatus contructed in accordance with the teachings of the present invention;

FIG. 10 is a cross-sectional view taken in the direction of line 10—10 of FIG. 9;

GENERAL DESCRIPTION

Figure 12:
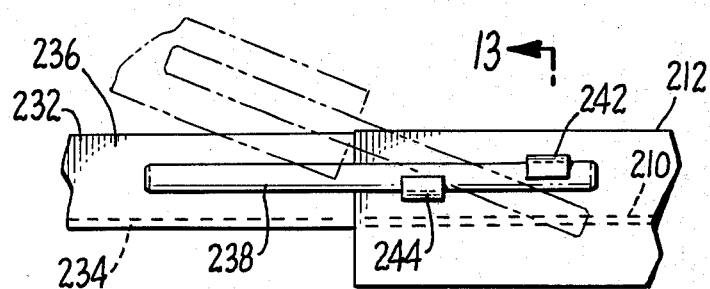
FIG. 12 is an enlarged side view showing operational details of a portion of the apparatus of FIG. 11.

Referring now to FIGS. 1–3, one form of apparatus incorporating the teachings of the present invention is illustrated. The apparatus is generally designated by reference numeral 10 and for purposes of illustration is illustrated as being disposed between two calender stacks 12 and 14 of a conventional papermaking machine. It will be appreciated, however, that the apparatus and method of the present invention may be effectively utilized in any operating environment wherein it is desirable to direct the free end of a moving web of flexible material to a desired location. In the illustrated operating environment calender stack 12 comprises two calender rolls 16 and 18 defining a nip through which normally passes a paper web 20 which has previously passed through the calender rolls of stack 14 during the papermaking process. The distance between the calender stacks of papermaking machines varies. However, it is not uncommon for such distances to approach or even exceed 20 feet or more.

In the process of making or converting paper or other relatively thin webs of flexible material web breaks occasionally occur. It will be appreciated that if one wishes to keep the machine through which the web passes in continuous operation, it is a somewhat difficult task to rethread the moving web especially when the web is moving at a relatively high velocity or if the break has occurred in a section of the machine in which a long distance exists between the operating elements between which the web normally passes. For example, it is not unusual for conventional papermaking machines to run at speeds up to 2400 feet per minute or more.

When a web break occurs between the calender stacks 12 and 14 of the illustrated portion of a papermaking machine, the free or tail end of the broken web is directed by the machine operator into a broke pit 24 which is formed below and adjacent to calender stack 14. The utilization of a broke pit is conventional in papermaking and similar machines. The portion of the web passing into the broke pit is normally later recovered for recycling through the process.

As previously mentioned, redirection web 20 into the nip formed by calender rolls 16 and 18 can be a difficult and unsafe procedure and the present invention has as one of its objects obviating such difficulties. Apparatus 10 comprises a channel member comprising a bottom wall element 26 and two side walls 28 and 30 extending substantially the full length of the bottom wall element. The bottom wall element and side walls thus define a channel member interior 32 open to the atmosphere at the top thereof and defining open channel member ends 34 and 36. In the particular apparatus embodiment illustrated, the bottom wall element 26, as may be noted most particularly with reference to FIG. 1, includes a substantially straight portion 38 and a substantially curved portion 42 adjoining same. It will be appreciated, however, that the particular shape of any given bottom wall element employed will vary dependent upon operational requirements. For example, the bottom wall element may be completely straight, curved throughout its length, etc. As will be seen, the wall element of apparatus constructed in accordance with the teachings of the present invention determines the path of the tail during the rethreading operation. This path will change in different operational environments. The channel member is supported by any suitable means such as framework (not shown) which may be fixedly secured in position or may be unaffixed to the floor on which it rests so that the apparatus 10 may be moved to different desired locations at the will of the operator as breaks occur at those locations.

As may best be seen with reference to FIG. 2, there is a space formed across the width of bottom wall element 26 between straight portion 38 and curved portion 42. In such space is disposed means in the form of a two-dimensional Coanda nozzle for introducing a thin sheet of high velocity gas into the interior 32 of the channel member and directing the gas along the straight portion 38 of the bottom wall element. This means comprises a bracket 54 which may be formed of rolled steel, extruded aluminum, or the like which extends between and is secured to side walls 28 and 30 in substantially airtight fashion. Bracket 54 includes an L-shaped bracket member 56 and a U-shaped bracket member 58 welded or otherwise secured thereto to provide three upstanding legs 62, 64 and 66. Welded or otherwise secured to the uppermost extent of legs 62 and 64 is a foil element 68 having an upper substantially smoothly curved flow attachment surface 74. The foil element 68 may also be formed of rolled steel, extruded aluminum or the like. While any suitable two-dimensional Coanda nozzle may be utilized to practice the teachings of the present invention, the illustrated form is preferred because it may be readily constructed from "off the shelf" steel or aluminum, etc. channel and foil shaped eliptical tubing components that may be cut to length and assembled. Also, as will be seen, the illustrated means for introducing and directing a high velocity gas has desirable adjustability features. The surface recedes from a restricted opening formed between the leading edge of the foil element 68 and the uppermost extent of upstanding leg 66, said restricted opening being in the form of an elongated slit 78 extending across the full extent of the channel member interior 32. Bracket members 56 and 58 and foil element 68 define an interior 70 which is in fluid flow communication with a pressurized gas supply line 80 (FIG. 3) which is connected at its other end to a suitable source (not shown) of pressurized gas such as air, with communication with the source of pressurized gas being selective at the will of the operator through a suitable and conventional valve means (also not shown). Thus, assuming that pressurized gas passes through supply line 80 it will exit through slit 78 in the form of a high speed sheet of substantially uniform thickness extending across the full width of the channel member interior 32. To practice the present invention it is necessary that the velocity of the gas exiting through slit 78 be greater than the velocity of the web 20 as it exits from calender stack 14.

Due to the Coanda effect, which can be briefly described as the tendency of a fluid, which emerges from a slit under pressure, to attach itself or cling to and follow a surface in the form of an extended lip of the slit, which lip recedes from the flow axis of the fluid as it emerges from the slit, the high speed stream of gas which passes through slit 78 attaches itself to the flow attachment surface 74 of the foil element 78 and is directed therealong so that the stream of moving gas moves along bottom wall element straight portion 38 toward channel member open end 34. Movement of such high speed gas causes the entrainment of ambient atmospheric air within the channel member interior. The high velocity gas and the entrained air result in a gaseous stream flowing along the length of the wall element straight portion 38 within the channel member interior 32 at a speed greater than the speed of the moving web 20.

In the embodiment of this invention illustrated in FIGS. 1–7 at least some of the entrained ambient air comes from a gap 86 that is formed between foil element 68 and the end of wall element portion 42. The entrained air that passes through this gap is directed along the foil surface 74 and thence along wall element straight protion 38. It is often desirable to adjust the size of gap 86 to control the entrained flow of air therethrough. In the illustrated embodiment, adjustment may be accomplished through manipulation of a flap element 88 hingedly connected at the end of curved portion 42 as at hinge 90. Suitable means (not shown) may be used to manipulate flap element 88 and hold it in the desired position.

Adjustment may also be made in the size of slit 78 in the arrangement illustrated wherein a plurality of adjustment screws 92 pass through drilled holes formed in leg 66 of bracket member 56 and matingly engage tapped holes formed in leg 64 of bracket member 58. By turning the screws 92 and tightening down adjustment lock nuts 94 bearing against the inside surface of leg 66 the operator may widen or narrow the slit 78 by moving leg 66 to a desired position. Gas flow through slit 78 may also be controlled of course by varying the pressure of the gas. The noted adjustments may be necessitated to accommodate different web speeds, web basis weights, etc.

It should be noted that the uppermost extent of leg 66 and hence also slit 78 are positioned below a plane extending from the end upper surface of wall element portion 42 to the upper surface of bevelled end of wall element portion 38 which matingly engages foil element 68 as most clearly seen in FIG. 2. This is to ensure that a web being entrained thereby will not engage the high velocity gas curtain immediately after exiting from slit 78 where the greater shear conditions exist and where tearing of weak webs is most likely. After the gaseous curtain and air entrained thereby flow around foil surface 74 these high shear conditions have dissipated somewhat and tearing of even a weak web is much less likely to occur.

In the embodiment of the invention illustrated in FIGS. 1–7, a second means for introducing and directing a high velocity gaseous flow into the channel interior 31 is located at the beginning of bottom wall element curved portion 42, i.e. at the right end of apparatus 10 as viewed in FIG. 1. This gaseous flow introducing and directing means is identical to that previously described, that is, it is in the form of a two-dimensional Coanda nozzle incorporating a bracket 54' and a foil element 68' mounted thereon to provide a restricted opening in the form of an elongated slit and a flow attachment surface associated therewith to direct the flow of gas passing through the slit due to the Coanda effect to the left as viewed in FIG. 1. Of course there is no gap corresponding to gap 86 since there is no bottom wall element portion downstream from curved portion 42. The bottom wall element curved portion 42 in essence constitutes an extension of the flow attachment surface of foil element 68' and the high speed gaseous flow remains essentially attached to the curved portion 42 until the combined stream of gas and entrained air hits the previously described first gas introduction and direction means formed at the point of juncture of bottom wall element straight portion 38 and curved portion 42.

The operation of the previously described apparatus will now be described with particular reference to FIGS. 4–7 showing sequential stages of the operation. Assuming that a break has occurred in web 20 the free end or tail of the web exiting from the nip of calendar stack 14 falls downwardly into broke pit 24 as shown in FIG. 4. It may be necessary for the operator to manually direct the tail into the broke pit; however, once movement into the pit has been established it will continue. The width of the illustrated form of apparatus 10 is quite narrow, for example, two to six inches wide, as compared to the width of a web passing through a conventional papermaking machine. While the principles of the present invention could be applied to rethreading apparatus running across the full web width, it will be appreciated that construction costs go up and operational flexibility normally decreases when such is the case. To produce a tail width that can be accommodated by relatively narrow apparatus 10, the machine operator narrows the effective width of the web in a conventional manner such as by use of a water jet at the wet end and/or paper knife at the dry end so that the web tail passing into the broke pit assumes a width less than the width of wall element 26. When it is desired to re-establish communication between the nip of calender stack 14 with that of calender stack 16, the apparatus 10 according to the present invention is actuated by introducing pressurized gas through gas supply line 80 and the corresponding line associated with foil element 68. This results in a continuous rapidly moving stream of air throughout the entire interior 32 of the channel member, such air flow being at a velocity greater than the speed of the web as it passes through the nip formed in calender stack 14. The reduced width tail is preferably cut, either manually by the operator or by means of a mechanical cutting device of any well-known type. The cut is preferably made just beyond the nip formed by the calender stack 14.

Immediately after the tail is cut a jet of pressurized air is directed against the newly established free end of tail of the web 20 by suitable air-directing means such as air hose 84 which is connected to a suitable source of pressurized air (not shown). In FIG. 5, application of the air blast forces the new tail to the left and into the channel member interior 32 whereupon it is entrained by the gaseous flow which has been commenced by the afore-described operation of the bracket 54' and foil element 68' combination. Since the velocity of such gaseous flow exceeds the paper machine speed the tail is straightened out (FIG. 6) and proceeds into engagement with the gaseous flow caused by the action of the bracket 54 and foil element 68 combination at the juncture of bottom wall element curved portion 42 and straight portion 38. In actual practice, the two foil element-bracket combinations provide for a substantially continuous stream of gas flow within the channel interior 42.

It will be appreciated that when the web tail reaches the open end 34 of the apparatus 10 it is "aimed" as shown in FIG. 6 toward the nip since the flow of air serves to keep the tail of the web in a substantially straight condition over a certain minimal distance due to the rapid flow of air as it exits from the channel interior 32 through the open end 34. It will also be appreciated that when the tail reaches the second bracket-foil element combination 54, 68, the web tail will be straightened so that it is removed from the curved portion 42. It will be further appreciated that when the tail enters the nip defined by calender rolls 16 and 18 it is pulled tight between the two nips and is completely lifted out of engagement with apparatus 10 (FIG. 7). Until the tail is lifted out of engagement with apparatus 10, side walls 28 and 30 serve to prevent sidewise movement of the tail. For this reason the side walls are deemed to be a preferred, although not absolutely essential feature, of the present invention. After the web enters the nip of calender stack 12 the operator widens the web to its full width in the well-known manner. It will thus be seen that with the present invention the operator need not come into close proximity with the nip of calendar stack 12 in order to thread same.

FIG. 8 shows an alternative embodiment of the apparatus according to the present invention. This particular version of the apparatus is designed to be hand-held by the operator and is particularly useful in those situations where threading is necessary at moderate distances, such as 2 to 6 feet. The hand-held apparatus 100 includes a bottom wall element 102 and upstanding side walls 104 and 106 connected thereto to define a channel member interior 108 and open channel member ends 110 and 112. In this embodiment the bottom wall element 102 comprises only a straight portion. Also in this embodiment only one bracket-foil element combination is employed to utilize the Coanda effect to direct a stream of air through the channel member interior. The bracket is identified by means of reference numeral 114 and the foil element is identified by means of reference numeral 116. The gas-introducing and directing means in the form of the bracket and foil member is of similar construction to that combination employed in the previously described embodiment shown in FIGS. 1–7.

Apparatus 100 additionally includes a hollow handle 120 having a conduit 122 attached thereto which serves to introduce a pressurized gas to the interior of the bracket 114 which is in communication with the slit formed between the bracket and the foil element 116. A flexible hose 128 leads from the interior of the handle 120 to a suitable source of pressurized gas such as air and communication is selectively established therewith by means of a suitable valve arrangement (not shown).

The operation of apparatus 100 is as follows. When it is desired to utilize apparatus 100 to convey a web tail to a desired location, the operator grasps handle 120 and actuates the valve means (not shown) which will cause pressurized gas to flow through hose 128 and thence through the elongated slit defined by foil element 116 and bracket 114. This rapidly moving stream of gas attaches itself to the flow attachment surface of the foil element 116 and is directed to the left as viewed in FIG. 8 along bottom wall element 102. Such movement of the gas causes entrainmemt of ambient air within channel member interior 108 in the manner previously described with reference to the embodiment of the apparatus of this invention shown in FIGS. 1–7. The operator then manipulates hand-held apparatus 100 so that the web tail is received within channel member interior 108 and entrained by the gaseous flow therein. As with the apparatus illustrated in FIGS. 1–7 it is important that the gas velocity within channel member interior 108 of hand-held apparatus 100 be greater than the speed of the web so that the web tail is pulled and may be readily directed to the desired predetermined location by the operator.

If desired, the apparatus 100 may be pivotally attached to a suitable framework to provide apparatus support while at the same time enabling the operator to change the angular disposition of the apparatus. Such a pivotally mounted apparatus would, for example, be positioned next to a broke pit to assist in directing the broken web into the pit when the apparatus is pivoted in a generally vertical plane aimed into the pit. Through manual manipulation to change the orientation of the apparatus about its pivot point the operator may redirect the web end to a desired "aiming point", such as a nip, to the first nozzle of another threading device, etc.

Referring now to FIGS. 9 and 10, yet another form of apparatus constructed in accordance with the teachings of the present invention is illustrated. This particular form of apparatus, designated by reference numeral 140, is illustrated as being positioned between rolls 142, 144, forming a nip through which exits a web (not shown) and a calender stack generally designated by means of reference numeral 146. The calender stack 146 comprises a plurality of rolls 148a through 148h defining a plurality of nips in the well-known manner. Apparatus 140 includes a wheel-mounted support base 150 of any desired construction. Projecting upwardly from the base at the right hand end thereof as viewed in FIG. 9 are two upstanding support bars spaced from one another. Only one of these support bars 152 is shown in FIG. 9. However, it will be readily appreciated that the other support bar spaced therefrom is of identical configuration and in alignment therewith. Projecting upwardly from the left hand end of support base 150 is a bracket 154 which has pivotally attached thereto in any desired fashion as by means of a pivot pin connection, a tubular support element 156 having an aperture 162 formed at the upper end thereof. A tube 158 of smaller diameter is selectively slidably positioned in support element 156 and has a plurality of spaced apertures 160 formed along a portion of the length thereof that may be selectively aligned with aperture 162 formed at the upper end of tubular support element 156. It will be appreciated that the tube 158 may be selectively positioned and maintained in that position relative to tubular support element 156 by positioning a cotter pin or the like through aperture 162 and any preselected one of apertures 160. Apparatus 140 also includes side walls 164 and 166 as well as a bottom wall element 168 having a curved portion 170 extending between the major lengthwise portions of side walls 164 and 166. High pressure gas introduction and direction means in the form of two-dimensional Coanda nozzles of the type described with reference to the invention embodiment of FIGS. 1–7, are positioned at both ends of curved portion 170 and designated by means of reference numerals 172 and 174. The side walls, 164, 166 and the bottom wall element 168 as well as the other structure fixedly associated therewith is pivotal about a pin 176 which passes between support bar 152 and its associated support bar (not shown) and through side walls 164 and 166. Bottom wall 168 is pivotally attached, as by means of a bracket and pin connection 177 to the upper end of tube 158.

At their leftmost extent as viewed in FIG. 9, side walls 164 and 166 decrease in height and the upper portions thereof are bent over to provide inverted U-shaped sliding channels 178 and 180 as shown in FIG. 10. An extension element 182 having a bottom 184 and side walls 186 and 188 is selectively slidably positioned with respect to a straight portion 190 of bottom wall element 168 and the side walls 164 and 166. Side walls 186 and 188 of extension element 182 are bent over as shown to cooperate with and be housed in sliding channels 178 and 180. It will be appreciated that the operator can slide the extension element 182 manually relative to the rest of the apparatus against the frictional forces existing therebetween.

Apparatus 140 is thus adaptable for use in a wide variety of operational environments. For example, apparatus 140 may be used to deliver the tail of a web selectively to various nips of a relatively large calender stack such as calender stack 146. The operator can adjust the angle of the tail path by making suitable adjustments with the previously described adjustment mechanism of apparatus 40. The extension element may be extended relative to the rest of the apparatus 140 to ensure that the end of the tail is in close enough proximity to the location where it is to be directed for the apparatus 140 to operate correctly.

Figure 13:
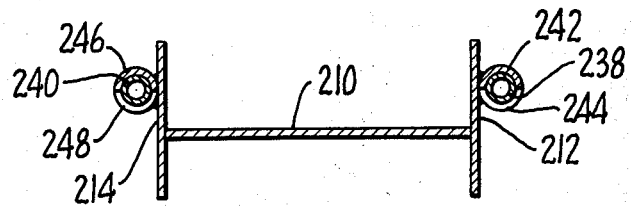
FIG. 13 is a cross-sectional view taken in the direction of line 13—13 of FIG. 12.
Figure 11:
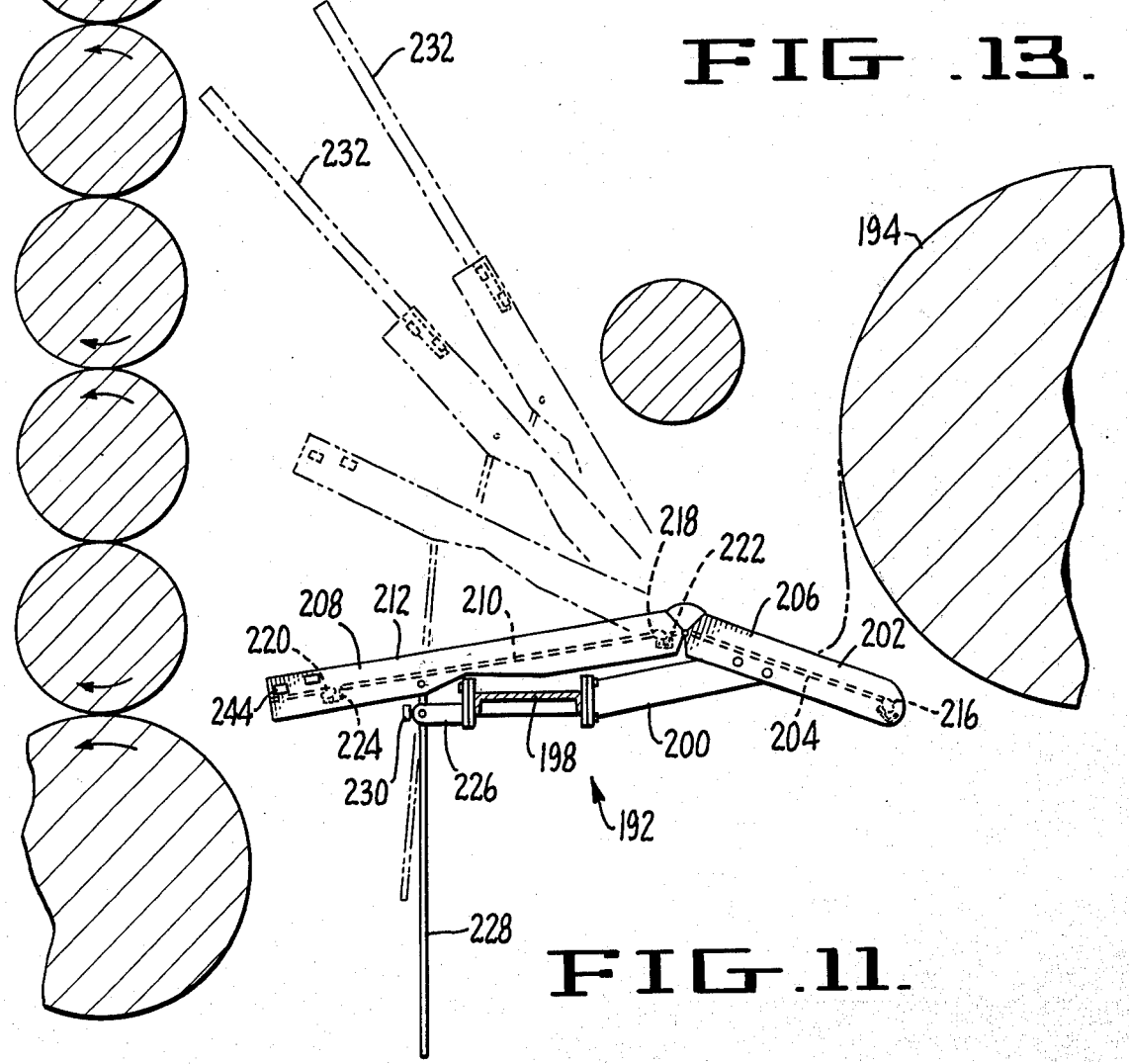
FIG. 11 is a schematic side view illustrating a third alternative form of apparatus constructed in accordance with the teachings of the present invention.

A still further form of apparatus constructed in accordance with the teachings of the present invention is illustrated in FIGS. 11, 12 and 13. This form of apparatus is one that is specifically adapted for use as a more or less permanent fixture at a location relative to a paper machine, etc. In this particular instance the apparatus 192 is positioned between a paper machine dryer can 194 and a calender stack 196. The apparatus illustrated has been affixed to a permanent walkway 198 positioned between the dryer can and the calender stack. The apparatus 192 includes a support arm 200 attached by bolts or the like to the side of the walkway in the manner illustrated. The other end of support arm 200 is attached to apparatus segment 202 which is adapted to be maintained in a fixed position relative to the walkway and the support arm 200. Apparatus segment 202 includes a substantially straight bottom wall element portion 204 and two side walls attached to bottom wall element portion 204 and extending therealong only one of which, the side wall 206, is shown. Pivotally attached to apparatus segment 202 in any desired manner is a second segment 208 which also includes a substantially straight bottom wall element portion 210 and side walls 212 and 214 connected to the second bottom wall element portion 210 and extending therealong. Apparatus 192 also includes three separate gas-introducing and directing means in the form of two-dimensional Coanda nozzles identified by means of reference numerals 216, 218 and 220. Two of these nozzles, nozzles 218 and 220, are associated with gaps 222 and 224 formed in the apparatus bottom wall element. These gaps serve as means for introducing entrained air into the system as was described in detail with reference to the embodiment of FIGS. 1–7. Nozzle 216 does not have a similar gap associated with it since it lies at the outermost extent of first apparatus segment 202.

Also extending from the walkway 198 is an adjustment support arm 226 which has a vertically disposed throughbore (not shown) formed therein through which a support rod 228 is slidably disposed. A set screw 230 may be manipulated by the operator in a well-known fashion to adjust the position of support rod 228 relative to adjustment support arm 226. The upper end of support rod is povitally connected to the bottom of apparatus second segment 208 in any desired manner. As may be seen most clearly with reference to FIG. 11 second segment 208 may be pivoted relative to first segment 202 by moving the rod 228 to various positions relative to support arm 226. Several illustrative positions of apparatus second segment 208 are shown in phantom in FIG. 11 wherein the second segment is shown as being aimed to various nip positions of calender stack 196.

It is obvious that as the second apparatus segment 208 is "aimed" to upper nips of the calender stack the end of the segment is positioned further and further away from the location where it is desired to direct the tail of the web. For this reason, apparatus 192 incorporates means whereby the effective length thereof may be increased through the addition of one or more extension sections. A portion of one such extension section 232 is shown in FIG. 12 and the complete extension section 232 is shown in phantom in FIG. 11. when apparatus 192 is "aimed" at two of the topmost nips in the calender stack 196.

As may most clearly be seen with reference to FIGS. 12 and 13 extension segment 232 includes a flat bottom wall 234 and two upstanding parallel side walls connected thereto, only one of said side walls 236 being shown. Attachment bars 238 and 240, both in the shape of elongated rods with circular cross-section, are attached to the side walls of extension segment 232 as by welding with a significant portion of said bars extending beyond the ends of the extension segment bottom wall 234 and the side walls. These attachment bars 238 and 240 are adapted to overlie side walls 212 and 214 of apparatus second segment 208 and be held by braces 242, 244 welded to side wall 212 and braces 246, 248 welded to side wall 214. Each of the braces 242–248 has a semi-circular cross-section. Braces 242 and 246 restrain their associated attachment bars from upward movement while braces 244 and 248 restrain their associated bars against downward movement as the extension segment 232 is continuously urged downwardly by the force of gravity. It will be readily appreciated that this arrangement enables the extension segment to be readily removed from the rest of apparatus 192 when not needed. When the extension segment 232 is attached to the rest of apparatus 192 through the interaction of the braces and attachment bars bottom wall 234 thereof is maintained in substantial alignment with bottom wall element portion 210 of second apparatus segment 208 whereby a smooth flow of air therealong is maintained.

Although the embodiments of the invention have been illustrated for use when web breakages occur it will be appreciated that the invention may be used in other circumstances where feeding of a new web tail is necessary, for example, upon machine startup, changing of web grades, etc. Further, it will be appreicated that although some of the embodiments of the invention use a plurality of Coanda nozzles, in some operating environments it may not be necessary to operate all such nozzles at one time.

What is claimed is:

1. Apparatus for directing the tail of a web of flexible material to a predetermined location comprising:
a first wall element having a surface open to the atmosphere and defining a path of movement for said web tail and having a terminal end adapted to be directed toward said predetermined location; a bracket fixedly positioned relative to said first wall element and including a substantially straight upstanding leg portion, a foil element fixedly mounted on said bracket, said foil element having a substantially smoothly curved fluid flow attachment surface spaced from the upstanding leg portion to define a restricted opening communicating with said path of movement, said fluid flow attachment surface leading from said restricted opening toward said wall element terminal end whereby gas under pressure passing through said restricted opening will attach itself to said fluid flow attachment surface due to the Coanda effect and entrain ambient air and said web tail to direct said web tail to said predetermined location.

2. Apparatus for directing the tail of a web of flexible material to a predetermined location comprising:
a first wall element having a surface open to the atmosphere and defining a path of movement for said web tail and having a terminal end adapted to be directed toward said predetermined location; means defining a restricted opening communicating with said path of movement including a foil element having a substantially smoothly curved fluid flow attachment surface leading from said restricted opening toward said first wall element terminal end whereby gas under pressure passing through said restricted opening will attach itself to said fluid flow attachment surface due to the Coanda effect and entrain ambient air and said web tail to direct said web tail to said predetermined location; additional wall elements fixedly positioned along the edges of said first wall element in the direction of said path of movement to form a channel member defining an interior open to the atmosphere adapted to receive said web tail therein; and a handle attached to said channel member, said handle defining a flow path for pressurized gas which is in fluid-flow communication with said channel member interior through said restricted opening.

3. Apparatus for directing the tail of a web of flexible material to a predetermined location comprising:
a first wall element having a surface open to the atmosphere and defining a path of movement for said web tail and having a terminal end adapted to be directed toward said predetermined location; means defining a restricted opening communicating with said path of movement including a foil element having a substantially smoothly curved fluid flow attachment surface leading from said restricted opening toward said first wall element terminal end whereby gas under pressure passing through said restricted opening will attach itself to said fluid flow attachment surface due to the Coanda effect and entrain ambient air and said web tail to direct said web tail to said predetermined location; additional wall elements fixedly positioned along the edges of said first wall element in the direction of said path of movement to form a channel member defining an interior open to the atmosphere adapted to receive said web tail therein; and means for selectively increasing the operational length of said channel member.

4. The apparatus of claim 3, wherein said means for selectively increasing the operational length of said channel member comprises at least one channel member extension element affixed to the terminal end of said channel member.

5. In combination:
first mechanical means having a web contact surface for delivering a web of flexible material at a predetermined web velocity;
second mechanical means having a web a contact surface for receiving said web of flexible material and spaced from said first mechanical means, said first and second mechanical means normally cooperating to transport said web of flexible material therebetween along a predetermined first path of web movement; and
apparatus disposed between said first and second mechanical means and spaced from said first path of web movement for receiving the tail of the web from said first mechanical means and delivering said tail to the second mechanical means, said apparatus comprising at least one apparatus segment including an elongated first wall element having a web entry end and a web exit end and defining a second path of web movement differing from said first path of web movement and adjacent thereto, means defining a restricted opening communicating with said second path of web movement located at the first wall element web entry end and including a foil element having a substantially smoothly curved fluid flow attachment surface leading from said restricted opening toward the first wall element whereby gas under pressure passing through said first restricted opening will attach itself to said foil element fluid flow attachment surface due to the Coanda effect and entrain ambient air to provide a gaseous flow along said first wall element toward the web exit end thereof at a velocity exceeding the predetermined web velocity so that said web tail is entrained along said first wall element by the gaseous flow and delivered thereby to said second mechanical means, said web contact surface of said second mechanical means adapted to move faster than the web contact surface of the first mechanical means whereby the web will be drawn taut when the tail thereof is engaged by said second mechanical means causing the web to withdraw itself from the second path of web movement and move along said first path of web movement, said first wall element being unobstructed and open to the atmosphere so as not to impede such web withdrawal.

6. The apparatus of claim 5 wherein said first wall element is divided into at least two spaced wall element portions, means defining a second restricted opening communicating with the second path of web movement located between said wall element portions and including a second foil element having a substantially smoothly curved fluid flow attachment surface leading from said second restricted opening toward said first wall element whereby gas under pressure passing through said second restricted opening will attach itself to said second foil element fluid flow attachment surface due to the Coanda effect and entrain ambient air to provide a gaseous flow along said first wall element toward the web exit end thereof.

7. The apparatus of claim 6 wherein the spaced wall element portions define a gap therebetween providing fluid flow communication between said second path of movement and the ambient atmosphere.

8. The apparatus of claim 7 additionally comprising means for selectively varying the size of the gap.

9. The apparatus of claim 5 wherein additional wall elements are fixedly positioned along the edges of said first wall element in the direction of said second path of movement to form a channel member defining an interior open to the atmosphere adapted to receive said web tail therein.

10. The apparstus of claim 9 wherein said first wall element is a bottom wall element and said additional wall elements are two side wall elements extending substantially the full length of said bottom wall element, said foil element operatively associated with said bottom wall element to direct the gaseous flow therealong.

11. The apparatus of claim 5 wherein said said first restricted opening is in the form of an elongated slit extending across substantially the full width of said first wall element with the major axis of said slit being disposed substantially perpendicular to the major axis of said wall element.

12. A method of directing a continuously moving web of flexible material having a tail to a predetermined first path of movement extending between spaced first and second mechanical means comprising the steps of:
  positioning means defining a flow path for gas between said first and second mechanical means adjacent to said first path of web movement and along a second path of web movement;
  flowing a pressurized gas through a restricted opening communicating with said gas flow path in a direction differing from the direction of said gas flow path;
  changing the direction of the pressurized gas after it passes through said restricted opening through utilization of the Coanda effect so that a gaseous flow is established along the gas flow path at a velocity exceeding the velocity of the web and toward the second mechanical means;
  bringing the web tail into engagement with the gaseous flow after the web tail has been delivered by the first mechanical means so that the web tail is entrained and propelled along said second path of web movement toward said first mechanical means; and
  pulling the web taut after it engages the second mechanical means so that the web moves from said second path of web movement to said first path of web movement.

13. The method of claim 12, wherein said gas flow path is open to the atmosphere and said gaseous flow along said flow path is the combined flow of said stream of pressurized gas and any ambient air entrained thereby.

14. The method of claim 12 additionally comprising the steps of narrowing said web tail prior to placing the web tail into engagement with said gaseous flow and widening the web after the web has engaged the second mechanical means.

15. The method of claim 12 additionally comprising the step of cutting the web to form the web tail to be directed to said predetermined location.

* * * * *